(12) United States Patent
Chan et al.

(10) Patent No.: US 10,372,379 B2
(45) Date of Patent: Aug. 6, 2019

(54) COMMAND PROCESSING METHOD AND STORAGE CONTROLLER USING THE SAME

(71) Applicant: SHENZHEN EPOSTAR ELECTRONICS LIMITED CO., Shenzhen (CN)

(72) Inventors: Ke-Wei Chan, Hsinchu (TW); Di-Hsien Ngu, Hsinchu County (TW); Hung-Chih Hsieh, Hsinchu County (TW)

(73) Assignee: SHENZHEN EPOSTAR ELECTRONICS LIMITED CO., Shenzhen (CN)

( * ) Notice: Subject to any disclaimer, the term of this patent is extended or adjusted under 35 U.S.C. 154(b) by 0 days.

(21) Appl. No.: 15/904,443

(22) Filed: Feb. 26, 2018

(65) Prior Publication Data
US 2019/0155541 A1 May 23, 2019

(30) Foreign Application Priority Data
Nov. 22, 2017 (TW) .............................. 106140428 A

(51) Int. Cl.
*G06F 3/06* (2006.01)
(52) U.S. Cl.
CPC ............ *G06F 3/0659* (2013.01); *G06F 3/061* (2013.01); *G06F 3/0679* (2013.01)
(58) Field of Classification Search
CPC ..... H04L 47/50; H04L 47/522; H04L 47/562; H04L 47/621; H04L 47/6255; G06F 11/0724; G06F 9/4881
(Continued)

(56) References Cited

U.S. PATENT DOCUMENTS

| 4,805,107 A | * | 2/1989 | Kieckhafer | ........... G06F 9/4881 |
| | | | | 714/15 |
| 5,860,089 A | * | 1/1999 | Ishii | ...................... G06F 3/0626 |
| | | | | 710/5 |

(Continued)

FOREIGN PATENT DOCUMENTS

| CN | 102741801 | 3/2015 |
| TW | 201224737 | 6/2012 |

(Continued)

OTHER PUBLICATIONS

"Office Action of Taiwan Counterpart Application", dated Jun. 6, 2018, p. 1-p. 3.

*Primary Examiner* — Faisal M Zaman
(74) *Attorney, Agent, or Firm* — JCIPRNET

(57) ABSTRACT

A command processing method and a storage controller using the same are provided. The command processing method includes: receiving a plurality of I/O commands; categorizing the I/O commands into a plurality of groups according to a processor effort index of the I/O commands; selecting a first group from the groups, resetting a timer and obtaining an expiration time corresponding to the first group according to the I/O commands of the first group, and executing the I/O commands of the first group; and selecting a second group from the groups and resetting the timer when the expiration time of the first group expires, wherein when the processor effort index of the first group is less than a threshold, a clock frequency of the processor is lowered before the expiration time expires.

18 Claims, 6 Drawing Sheets

(58) Field of Classification Search
USPC .............................................. 718/102; 710/5
See application file for complete search history.

(56) References Cited

U.S. PATENT DOCUMENTS

| | | | | |
|---|---|---|---|---|
| 6,144,995 | A * | 11/2000 | Maya .................. | G06F 12/0284 |
| | | | | 709/213 |
| 6,229,795 | B1 * | 5/2001 | Pankaj .................... | H04L 47/14 |
| | | | | 370/329 |
| 7,451,341 | B2 | 11/2008 | Okaki et al. | |
| 9,176,716 | B2 * | 11/2015 | Mattheis ................... | G06F 9/46 |
| 2003/0198204 | A1 * | 10/2003 | Taneja .................... | H04L 5/023 |
| | | | | 370/332 |
| 2005/0235108 | A1 * | 10/2005 | Hiratsuka ........... | G06F 12/0875 |
| | | | | 711/113 |
| 2010/0238579 | A1 * | 9/2010 | Saito ........................ | G11B 5/09 |
| | | | | 360/53 |
| 2013/0024864 | A1 * | 1/2013 | Lakshmi ............... | G06F 9/3851 |
| | | | | 718/102 |
| 2013/0111242 | A1 * | 5/2013 | Heller .................. | G06F 1/3206 |
| | | | | 713/323 |
| 2014/0088734 | A1 * | 3/2014 | Narutani ................ | G05B 19/05 |
| | | | | 700/28 |
| 2016/0026386 | A1 * | 1/2016 | Ellis ........................ | G06F 3/061 |
| | | | | 711/103 |
| 2016/0162187 | A1 | 6/2016 | Lee | |

FOREIGN PATENT DOCUMENTS

| | | |
|---|---|---|
| TW | 201516687 | 5/2015 |
| TW | 201518931 | 5/2015 |

\* cited by examiner

A $CEI_0=2/1$

B $CEI_1=3/2$

C $CEI_2=4/4$

D $CEI_3=5/8$

E $CEI_4=6/16$

F $CEI_5=7/32$

| C | B | D | E | B | C | A | D | F | A | D | C | F | A | B | E | ～510

| C | B | B | C | A | A | C | A | B | ～520
| | | | | D | E | D | D | E | ～521
| | | | | | | | F | F | ～522

COMMAND PROCESSING METHOD AND STORAGE CONTROLLER USING THE SAME

CROSS-REFERENCE TO RELATED APPLICATION

This application claims the priority benefit of Taiwan application serial no. 106140428, filed on Nov. 22, 2017. The entirety of the above-mentioned patent application is hereby incorporated by reference herein and made a part of this specification.

BACKGROUND

Technical Field

The invention relates to a command processing method and a storage controller using the same, and more particularly, to a command processing method capable of maximizing a processor usage and a storage controller using the method.

Description of Related Art

In general storage devices, commands are usually received from a host system through a storage controller, and the commands are then transmitted to a command queue pending for execution. When executing the commands, the storage controller accesses a storage medium (e.g., a non-volatile memory module) according to the commands in order to execute reading or writing functions.

However, there are many different types of the commands received from the host system, a processor execution time and a data transmission time for each type of the commands may be different from the others. Some of the commands may have the processor execution time less than the data transmission time while the other commands may have the processor execution time greater the data transmission time. When the different types of the commands are outputted from the command queue for execution, the commands having the processor execution greater than the data transmission time will lead to a considerable amount of fragmented processor idle times, resulting in waste of processor resources during the time. Therefore, how to utilize the processor resources more effectively is one of the major objectives for persons skilled in the art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a command processing method and a storage controller using the same, which are capable of saving system power consumption and fully utilizing performance of the processor during the idle time.

The invention provides a command processing method adapted to a storage controller. The storage controller is configured to access a storage medium and coupled to a host system. The command processing method includes: receiving a plurality of I/O commands. The command processing method further includes categorizing the I/O commands into a plurality of groups according to a processor effort index of the I/O commands. The command processing method further includes selecting a first group from the groups, resetting a timer and obtaining an expiration time corresponding to the first group according to the I/O commands of the first group, and executing the I/O commands of the first group. The command processing method further includes selecting a second group from the groups and resetting the timer when the expiration time of the first group expires. When the processor effort index of the first group is less than a threshold, a clock frequency of the processor is lowered before the expiration time expires.

In an embodiment of the invention, the groups include a third group, when the processor effort index of the I/O commands of the third group is less than a first value and the first value is less than the threshold, the processor lowers an original clock frequency of the processor to the original clock frequency multiplied by the first value before the expiration time of the third group expires.

In an embodiment of the invention, the storage controller communicates with the host system through a host interface, and the host interface supports an out-of-order execution (OOE) feature.

In an embodiment of the invention, the processor effort index is a processor I/O command execution time divided by a data transmission time corresponding thereto.

In an embodiment of the invention, the threshold is 1.

In an embodiment of the invention, the processor I/O command execution time is an execution time of the processor for a plurality of functions corresponding to one of the I/O commands, and the functions are directly correlated to a data transmission of said one of the I/O commands.

In an embodiment of the invention, the data transmission time is an estimated data transmission time of one of the I/O commands.

In an embodiment of the invention, the storage controller maps a transmission direction and a size of the I/O commands to a group index of the groups through a look-up table, and searches the look-up table through a command sorter, wherein the command sorter categorizes the I/O commands into the groups.

In an embodiment of the invention, the storage controller maps a transmission direction and a size of the I/O commands to the data transmission time through a look-up table, and searches the look-up table through a command queue manager corresponding to each of the group.

In an embodiment of the invention, the expiration time is a total of the data transmission time of the I/O commands of the first group, wherein the data transmission time is obtained from the look-up table.

The invention provides a storage controller, which is configured to access a storage medium and coupled to a host system. The storage controller includes: a command sorter; a plurality of command queue managers, coupled to the command sorter; an arbitrator, coupled to the command queue managers; a timer, coupled to the arbitrator; and a processor, coupled to at least one of the command sorter, the command queue managers and the arbitrator. The command sorter receives a plurality of I/O commands from the host system. The command sorter categorizes the I/O commands into a plurality of groups according to a processor effort index of the I/O commands. The arbitrator selects a first group from the groups, resets a timer and obtains an expiration time corresponding to the first group according to the I/O commands of the first group, and the processor executes the I/O commands of the first group. The arbitrator selects a second group from the groups and resets the timer when the expiration time of the first group expires. When the processor effort index of the first group is less than a threshold, a clock frequency of the processor is lowered before the expiration time expires.

In an embodiment of the invention, the groups include a third group, when the processor effort index of the I/O commands of the third group is less than a first value and the first value is less than the threshold, the processor lowers an original clock frequency of the processor to the original clock frequency multiplied by the first value before the expiration time of the third group expires.

In an embodiment of the invention, the storage controller communicates with the host system through a host interface, and the host interface supports an out-of-order execution (OOE) feature.

In an embodiment of the invention, the processor effort index is a processor I/O command execution time divided by a data transmission time corresponding thereto.

In an embodiment of the invention, the threshold is 1.

In an embodiment of the invention, the processor I/O command execution time is an execution time of the processor for a plurality of functions corresponding to one of the I/O commands, and the functions are directly correlated to a data transmission of said one of the I/O commands.

In an embodiment of the invention, the data transmission time is an estimated data transmission time of one of the I/O commands.

In an embodiment of the invention, the storage controller maps a transmission direction and a size of the I/O commands to a group index of the groups through a look-up table, and searches the look-up table through a command sorter, wherein the command sorter categorizes the I/O commands into the groups.

In an embodiment of the invention, the storage controller maps a transmission direction and a size of the I/O commands to the data transmission time through a look-up table, and searches the look-up table through a command queue manager corresponding to each of the group.

In an embodiment of the invention, the expiration time is a total of the data transmission time of the I/O commands of the first group, wherein the data transmission time is obtained from the look-up table.

Based on the above, the command processing method of the invention and the storage controller using the same can categorize the I/O commands into multiple groups according to the processor effort index. The timer is reset before the I/O commands of one specific group are executed, and the expiration time of the specific group is obtained according to the I/O commands of the specific group. If the processor effort index of an executing group is less than the threshold, the clock frequency of the processor may be lowered before the expiration time of the group expires. By categorizing the I/O commands according to the processor effort index, the commands with less processor usage may be collected into the same group such that the idle times of the processor may then be integrated. As a result, the idle time of the processor may be used to process other commands, or the clock frequency of the processor may be lowered during the idle time.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
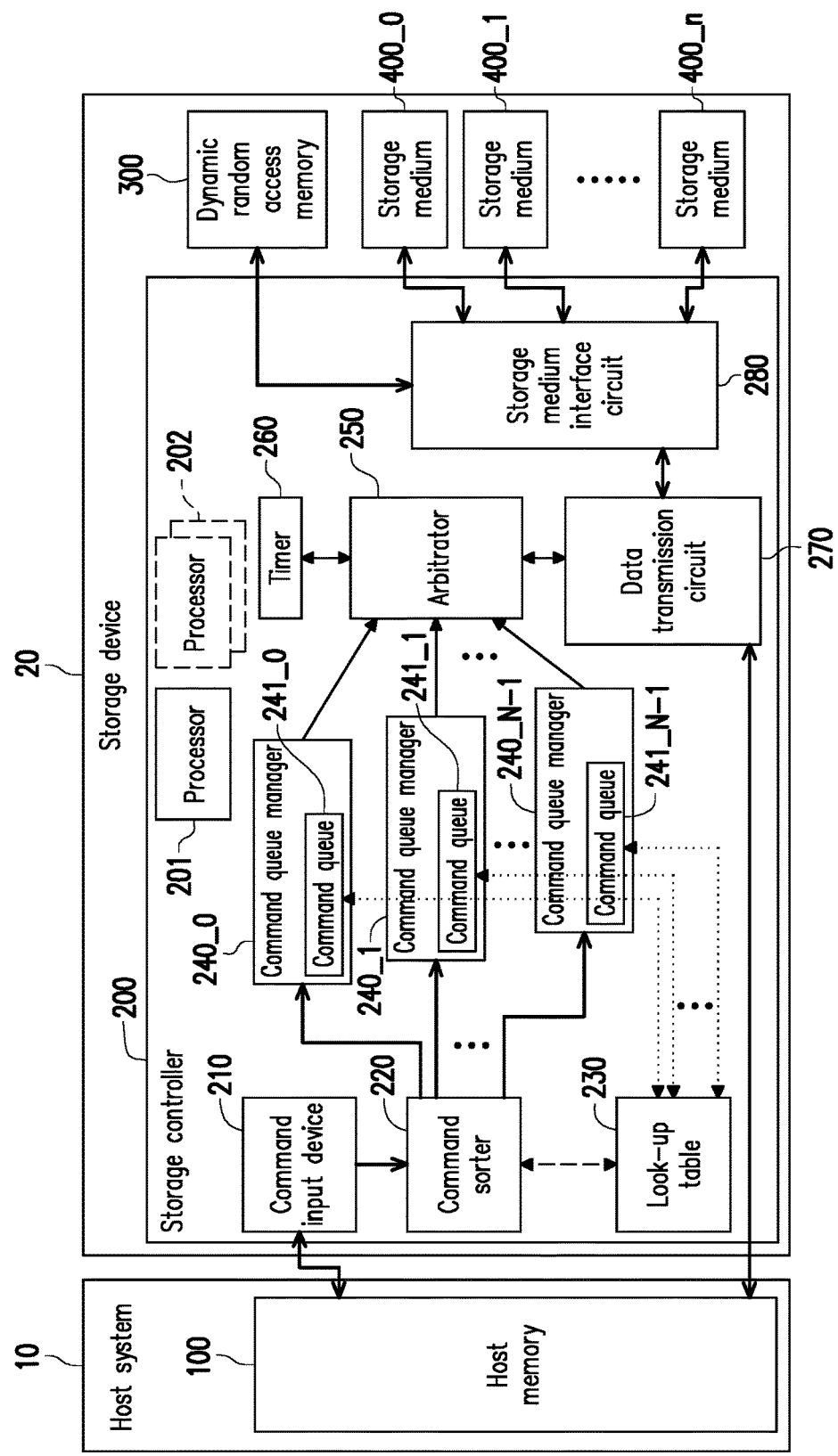
FIG. 1 is a block diagram illustrating a host system and a storage device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a storage device includes a rewritable non-volatile memory module and a storage device controller (also known as a storage controller or a storage control circuit). The storage device is usually used together with a host system so the host system may write data into or read data from the storage device.

FIG. 1 is a block diagram illustrating a host system and a storage device according to an embodiment of the invention.

Referring to FIG. 1, a host system 10 includes a host processor (not illustrated in the drawing), a host memory 100 and a data transfer interface circuit (not illustrated in the drawing). In the present embodiment, the data transfer interface circuit is coupled to (or, electrically connected to) the host processor and the host memory 100. In another embodiment, the host processor, the host memory 100 and the data transfer interface circuit are coupled to one another by utilizing a system bus.

A storage device 20 includes a storage controller 200, a dynamic random access memory (DRAM) 300, storage media 400_0 to 400_n and a connection interface circuit (not illustrated in the drawing). The storage media 400_0 to 400_n may be rewritable non-volatile memory modules.

In the present embodiment, the host system 10 is coupled to the storage device 20 through the data transfer interface circuit and the connection interface circuit of the storage device 20 (a.k.a. a host interface of the storage device 20) to perform a data access operation. For example, the host system 10 can store data into the storage device 20 or read data from the storage device 20 through the data transfer interface circuit.

In the present embodiment, the host processor, the host memory 100 and the data transfer interface circuit may be disposed on a main board of the host system 10. A quantity of the data transfer interface circuit may be one or more. Through the data transfer interface circuit, the main board may be coupled to the storage device 20 in a wired manner or a wireless manner. The storage device 20 may be, for example, a flash drive, a memory card, a solid state drive (SSD) or a wireless memory storage device. The wireless memory storage device may be, for example, a memory storage device based on various wireless communication technologies, such as a Near Field Communication (NFC) memory storage device, a Wireless Fidelity (WiFi) memory storage device, a Bluetooth memory storage device, a Bluetooth low energy (BLE) memory storage device (e.g., iBeacon). Further, the host system 10 may also be coupled to various I/O devices including a Global Positioning System (GPS) module, a network interface card, a wireless transmission device, a keyboard, a monitor and a speaker through the system bus.

In the present embodiment, the data transfer interface circuit and the connection interface circuit are interface circuits compatible with a Peripheral Component Interconnect Express (PCI Express) interface standard. Further, a data transmission is performed between the data transfer interface circuit and the connection interface circuit by using a Non-Volatile Memory express (NVMe) interface, an Advanced Host Controller Interface (AHCI) or a PCIe architecture Queuing Interface (PQI) protocols, and can include an out-of-order execution (OOE) feature. Here, the NVMe protocol can include Input/Output Submission Queue (IOSQ) and Input/Output Completion Queue (IOCQ) architectures, the AHCI protocol can include a Native Command Queue (NCQ) support, and the PQI protocol can include Input Queue (IQ) and Output Queue (OQ) architectures.

Nevertheless, it should be understood that the invention is not limited to the above. The data transfer interface circuit and the connection interface circuit may also be compatible to a PATA (Parallel Advanced Technology Attachment) standard, an IEEE (Institute of Electrical and Electronic Engineers) 1394 standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC interface standard, a UFS (Universal Flash Storage) interface standard, an eMCP interface standard, a CF interface standard, an IDE (Integrated Device Electronics) interface standard or other suitable standards. Further, in another embodiment, the connection interface circuit and the storage controller 200 may be packaged into one chip, or the connection interface circuit is distributed outside a chip containing the storage controller 200.

In the present embodiment, the host memory 100 is configured to temporarily store commands executed by the host processor or data. For instance, in the present exemplary embodiment, the host memory 100 may be a Dynamic Random Access Memory (DRAM), or a Static Random Access Memory (SRAM) and the like. Nevertheless, it should be understood that the invention is not limited thereto, and the host memory 100 may also be other appropriate memories.

In the present embodiment, the storage controller 200 includes a processor 201, a command input device 210, a command sorter 220, a look-up table 230, command queue managers 240_0 to 240_N−1, an arbitrator 250 and a timer 260. The command queue managers 240_0 to 240_N−1 include command queues 241_1 to 241_N−1, respectively. The processor 201 is in charge of processing host I/O commands. In addition to the processor 201, the storage controller 200 may further include one or more processors 202 in charge of processing other than the host I/O commands.

When a plurality of commands are received by the command input device 210 from the host memory 100, the command input device 210 transmits the commands to the command sorter 220. Then, the command sorter 220 categorizes the commands into different groups according to a processor effort index (CPU Effort Index; CEI) through the look-up table 230, and transmits the commands of the different groups to the command queues 241_0 to 241_N−1, respectively. The arbitrator 250 selects one of the command groups from the command queues 241_0 to 241_N−1 for execution, and the timer 260 controls an expiration time for executing the commands. Computational method regarding the processor effort index and a control method of the timer 260 will be described in more details below.

In the present embodiment, the storage controller 200 further includes a data transmission circuit 270 and a storage medium interface circuit 280. When the commands are being executed, the data transmission circuit 270 is configured to accept instructions of the processor 201 for performing the data transmission with the host memory 100. For example, the data may be read from the host system 10 (e.g., the host memory 100) through the connection interface circuit, and the read data may be written into the storage media 400_0 to 400_n through the storage medium interface circuit 280. As another example, the data may be read from the storage media 400_0 to 400_n through the storage medium interface circuit 280, and the read data may be written into the host system 10 (e.g., the host memory 100) through the connection interface circuit. The storage medium interface circuit 280 is configured to accept instructions of the processor 201, so as to perform a writing (a.k.a. programming) operation or a reading operation together with the data transmission circuit 270 on the data of the storage media 400_0 to 400_n. The storage medium interface circuit 280 can also perform an erasing operation on the storage media 400_0 to 400_n. Further, the data written in the storage media 400_0 to 400_n through the storage medium interface circuit 280 may be temporarily stored into the dynamic random access memory 300, and the data read from the storage media 400_0 to 400_n by the storage medium interface circuit 280 may also be temporarily stored into the dynamic random access memory 300.

It should be noted that, the timer 260 may be implemented by a hardware circuit. The command input device 210, the command sorter 220 and the arbitrator 250 may be implemented by hardware circuits or in a firmware manner. Also, the look-up table 230 may be implemented in a firmware manner. During a system initialization, a range of processor effort index corresponding to each command group may be pre-defined and followed by programming the processor effort index and the corresponding command group into the look-up table. Moreover, the look-up table also records a process time for the different commands in each command group.

Figure 2:
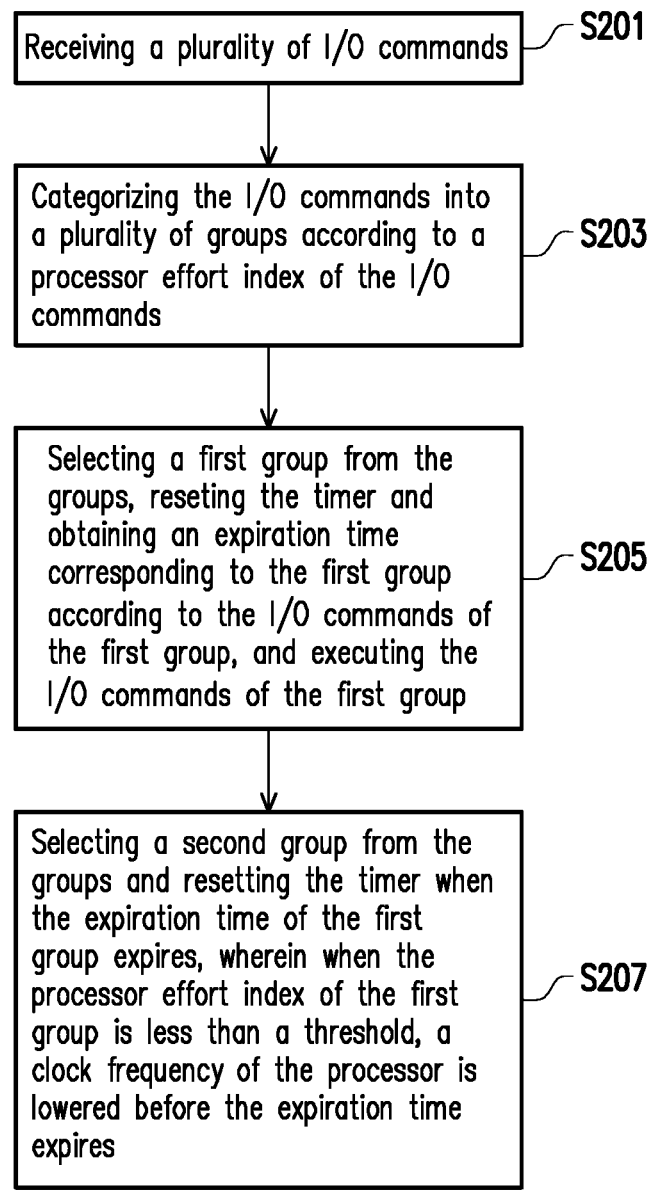
FIG. 2 is a flowchart illustrating a command processing method according an embodiment of the invention.

FIG. 2 is a flowchart illustrating a command processing method according an embodiment of the invention.

With reference to FIG. 2, in step S201, a plurality of I/O commands are received. Specifically, the command sorter 210 can receive the I/O commands from the host system 100.

In step S203, the I/O commands are categorized into a plurality of groups according to a processor effort index of the I/O commands. Specifically, the command sorter 220 categorizes the I/O commands of the command input device 210 into the groups according to the processor effort index (CPU Effort Index; CEI), and transmits the I/O commands of the different groups to the command queues 241_0 to 241_N−1 of the command queue managers 240_0 to 240_N−1, respectively.

It should be noted that, the processor effort index (CEI) is a processor I/O command execution time divided by a data transmission time corresponding thereto. The processor I/O command execution time is an execution time of the processor for a plurality of functions corresponding to one of the I/O commands, and the functions are directly correlated to a data transmission of said one of the I/O commands. Said functions are, for example, a hardware engine activation for Direct Memory Access (DMA), an internal buffer configuration, a command issue for storage medium access protocol, tasks assigned to the other processors 202 by the processor 201, etc. On the other hand, a time for executing a garbage collection operation for SSD does not belong to the processor I/O command execution time. The data transmission time is an estimated data transmission time of one of the I/O commands.

In the present embodiment, the storage controller 200 can map a transmission direction and a size of the I/O commands to a group index corresponding to the groups through the look-up table 230, and search the look-up table 230 through the command sorter 220. Further, the storage controller 200 also maps the transmission direction and the size of the I/O commands to the data transmission time through the look-up table 230, and searches the look-up table 230 through the command queue managers 240_0 to 240_N−1 corresponding to each of the groups.

In step S205, a first group is selected from the groups, the timer 260 is reset and an expiration time corresponding to the first group is obtained according to the I/O commands of the first group, and the I/O commands of the first group are executed. Specifically, the arbitrator 250 selects the first group (e.g., the command queue) for executing the I/O commands of the first group (e.g., the I/O commands in the command queue 240_1). When the first group is selected by the arbitrator 250, the arbitrator 250 resets the timer 260, obtains the expiration time corresponding to the first group according to the I/O commands of the first group, and then transmits the expiration time to the timer 260.

In step S207, a second group is selected from the groups and the timer is reset when the expiration time of the first group expires, wherein when the processor effort index of the first group is less than a threshold, a clock frequency of the processor is lowered before the expiration time expires. Specifically, when the expiration time of the first group expires, namely, when an expiration notification is received by the arbitrator 250 from the timer 260, the arbitrator 250 selects the next group for execution and repeats the step of resetting the timer 260. It should be noted that, the expiration time is a total of the data transmission time of the I/O commands of the first group, wherein the data transmission time may be obtained from the look-up table 230.

In the present embodiment, when all processor effort indices (CEI) of the I/O commands of one specific group are less than or equal to 1, it means that the processor 201 has an idle time when executing the commands of that specific group. Therefore, the processor 201 can lower the clock frequency of the processor 201 before the expiration time of the specific group expires, so as to achieve a power-saving effect. In another embodiment, when the processor effort index (CEI) of the I/O commands of one specific group is less than or equal to 1, if all the necessary functions for activating the data transmission are completed by the processor 201 while the expiration time of that specific group does not expire, the processor 201 can process other tasks besides the host I/O command by using the idle time pending for the data transmission.

Figure 3:
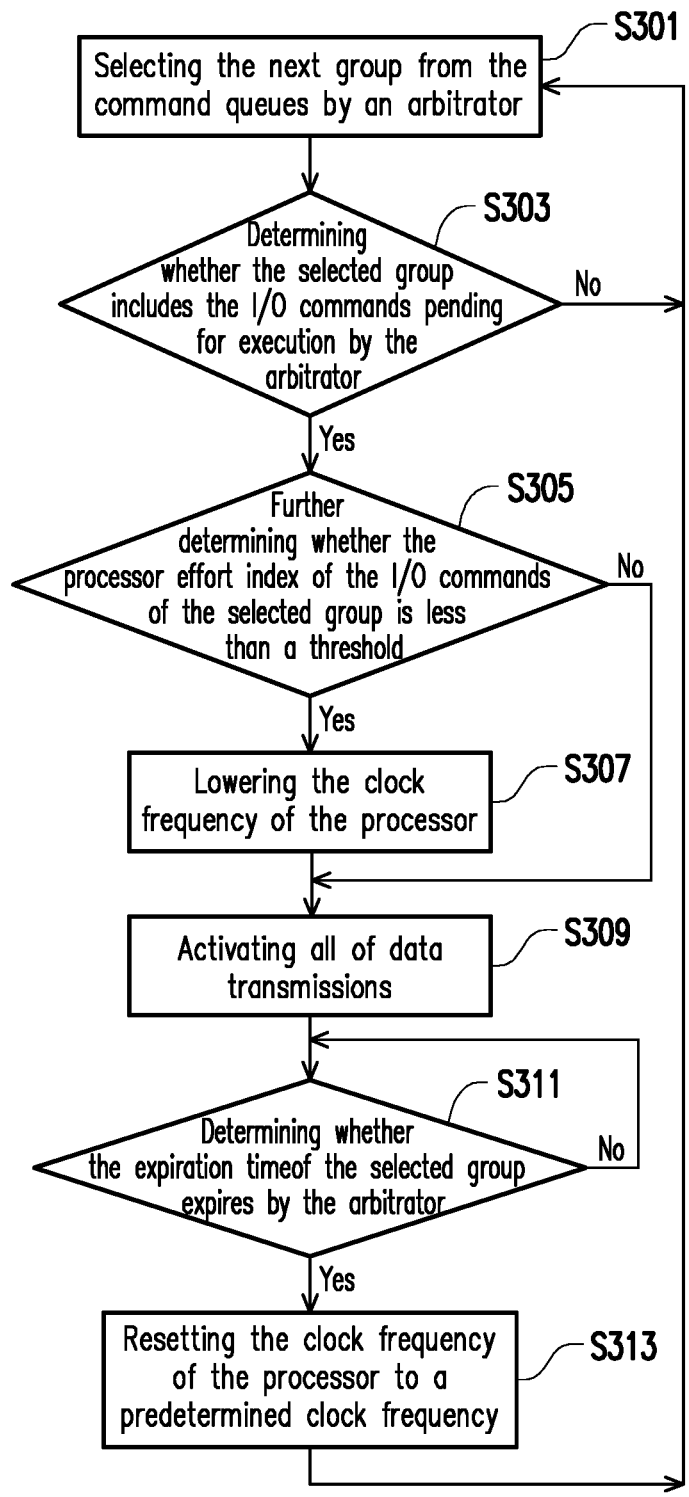
FIG. 3 is a flowchart illustrating a command processing method according another embodiment of the invention.

FIG. 3 is a flowchart illustrating a command processing method according another embodiment of the invention.

With reference to FIG. 3, in step S301, the arbitrator 250 selects the next group from the command queues 241_0 to 241_N−1.

In step S303, the arbitrator 250 determines whether the selected group includes the I/O commands pending for execution. If the selected group does not include the I/O commands pending for execution, the method returns to step S301.

If the selected group includes the I/O commands pending for execution, in step S305, whether the processor effort index of the I/O commands of the selected group is less than a threshold is further determined.

If the processor effort index of the I/O command of the selected group is not less than the threshold, in step S309, all of data transmissions are activated directly.

If the processor effort index of the I/O command of the selected group is less than the threshold, in step S307, the clock frequency of the processor 201 is lowered first. Then, all of the data transmissions are activated in step S309.

In step S311, the arbitrator 250 determines whether the expiration time of the selected group expires.

If the expiration time of the selected group already expires, in step S313, the clock frequency of the processor 201 is reset to a predetermined clock frequency. Then, the method returns to step S301 so the next group can be continuously selected.

Figure 4:
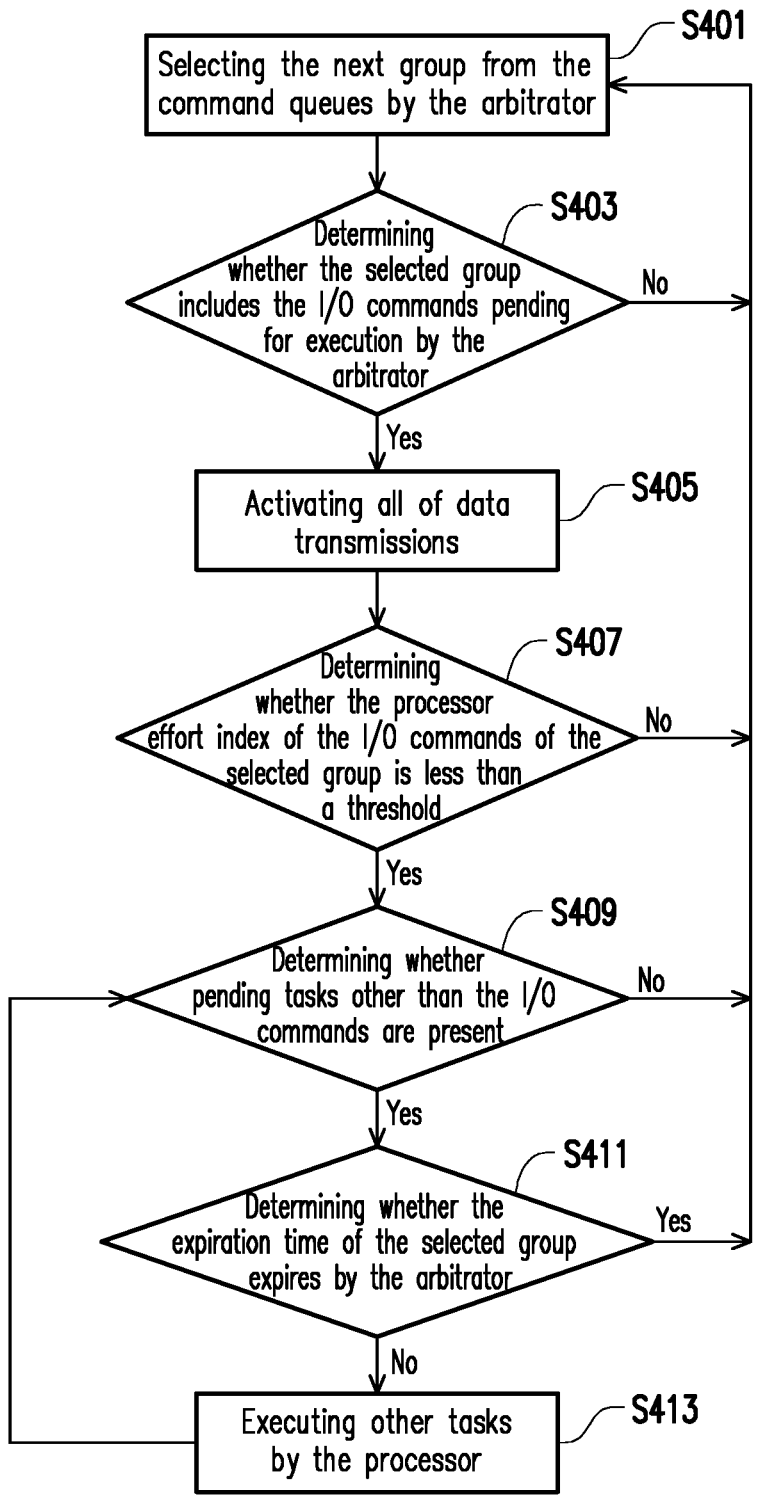
FIG. 4 is a flowchart illustrating a command processing method according another embodiment of the invention.

FIG. 4 is a flowchart illustrating a command processing method according another embodiment of the invention.

With reference to FIG. 4, in step S401, the arbitrator 250 selects the next group from the command queues 241_0 to 241_N−1.

In step S403, the arbitrator 250 determines whether the selected group includes the I/O commands pending for execution. If the selected group does not include the I/O commands pending for execution, the method returns to step S401.

If the selected group includes the I/O commands pending for execution, in step S405, all of data transmissions are activated.

In step S407, whether the processor effort index of the I/O commands of the selected group is less than a threshold is determined.

If the processor effort index of the I/O command of the selected group is not less than the threshold, in step S401, the method directly returns to step S401 right after all of the data transmissions are completed.

If the processor effort index of the I/O command of the selected group is less than the threshold, in step S409, whether pending tasks other than the I/O commands are present is determined.

If the pending tasks other than the I/O commands are not present, the method directly returns to step S401 right after all the data transmissions are completed.

If the pending tasks other than the I/O commands are present, in step S411, the arbitrator 250 determines whether the expiration time of the selected group expires.

If the expiration time of the selected group already expires, the method directly returns to step S401.

If the expiration time of the selected group does not expire, in step S413, the processor 201 executes other tasks. Then, after said other tasks are completed, the method returns to step S409 so whether the pending tasks other than I/O commands are present can be continuously determined. It should be noted that, a time spent for completing said other tasks must end before the expiration time of the selected group expires.

Figure 5A:
FIG. 5A and FIG. 5B illustrate an example using the command processing method according an embodiment of the invention.
Figure 5A:
Figure 5A:
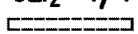
Figure 5A:
Figure 5A:
Figure 5A:
Figure 5B:
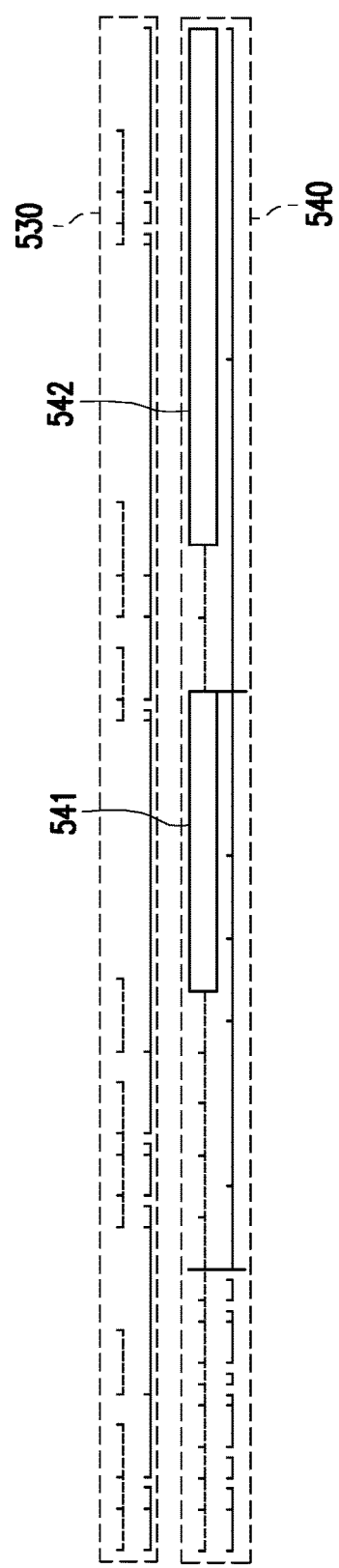

FIG. 5A and FIG. 5B illustrate an example using the command processing method according an embodiment of the invention.

With reference to FIG. 5A and FIG. 5B, in this example, it is assumed that there are six types of host I/O commands A, B, C, D, E and F. Taking the command A for example, since the processor I/O command execution time of the command A (marked by dotted line) is 2 and the data transmission time (marked by solid line) is 1, the processor effort index of the command A ($CEI_0$) is 2/1. The processor I/O command execution times, the data transmission times and $CEI_1$ to $CEI_5$ of the commands B to F may be derived from the above.

In the command processing method of the present example, the commands A to F may be categorized into a group 0, a group 1 and a group 2. Here, the group 0 includes commands satisfying $CEI \geq 1$, which are the commands A, B and C. The group 1 includes commands satisfying $0.25 < CEI < 1$, which are the commands D and E. The group 2 includes commands satisfying $CEI \leq 0.25$, which is the command F.

A command queue 510 is an example of a command queue not using the command processing method of the invention. A command queue 520, a command queue 521 and a command queue 522 are a plurality of groups obtained by categorizing the command queue 510 according to the command processing method of the invention.

A time relation chart 530 shows a relation between the processor I/O command execution time (solid line portion) and the data transmission time (dotted line portion) when the command queue 510 is executed. In view of the time relation chart 530, although the processor 201 is provided with many idle times, the idle times are distributed over different time segments and cannot be effectively utilized.

A time relation chart 540 shows a relation between the processor I/O command execution time (solid line portion) and the data transmission time (dotted line portion) when the command queue 520, the command queue 521 and the command queue 522 are sequentially executed. In the command processing method of the invention, with the commands categorized by CEI, when CEI of the commands in the group is less than 1, the idle times of the processor 201 during execution of the commands may be integrated into one continuous segment, such as an idle time 541 of the group 1 and an idle time 542 of the group 2. In the idle time 541 and the idle time 542, the processor 201 may be used to execute other tasks.

On the other hand, with the group 2 as an example, when the arbitrator 250 chooses to execute the commands of the group 2, the clock frequency of the processor 201 may be lowered according to CEI of the group 2. Because CEIs of the commands of the group 2 are all less than 0.25, the clock frequency of the processor 201 may be lowered to an original clock frequency multiplied by ¼ when the commands of the group 2 are executed, and the clock frequency of the processor 201 may be adjusted back to the original clock frequency before the commands of the next group are to be executed (i.e., when the expiration time of the group 2 expires). In this way, the power-saving effect may be achieved by lowering the frequency of the processor 201 when the commands of the group with CEI less than 1 are executed.

In summary, the command processing method of the invention and the storage controller using the same can categorize the I/O commands into multiple groups according to the processor effort index. The timer is reset before the I/O commands of one specific group are executed, and the expiration time of the specific group is obtained according to the I/O commands of the specific group. If the processor effort index of the executed group is less than the threshold, the clock frequency of the processor may be lowered before the expiration time of the group expires. By categorizing the I/O commands according to the processor effort index, the commands with less processor usage may be collected into the same group such that the idle times of the processor may then be integrated. As a result, the idle time of the processor may be used to process other commands so the processor resources can be utilized more effectively, or the clock frequency of the processor may be lowered during the idle time so the power-saving effect can be achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A command processing method, adapted to a storage controller, the storage controller being configured to access a storage medium and coupled to a host system, the command processing method comprising:

receiving a plurality of I/O commands;

categorizing the I/O commands into a plurality of groups according to a processor effort index of the I/O commands;

selecting a first group from the groups, resetting a timer and obtaining an expiration time corresponding to the first group according to the I/O commands of the first group, and executing the I/O commands of the first group; and selecting a second group from the groups and resetting the timer when the expiration time of the first group expires, wherein when the processor effort index of the first group is less than a threshold, a clock frequency of the processor is lowered before the expiration time expires, wherein the processor effort index is a processor I/O command execution time divided by a data transmission time corresponding thereto.

2. The command processing method according to claim 1, wherein the groups comprise a third group, and when the processor effort index of the I/O commands of the third group is less than a first value and the first value is less than the threshold, the processor lowers an original clock frequency of the processor to the original clock frequency multiplied by the first value before the expiration time of the third group expires.

3. The command processing method according to claim 1, wherein the storage controller communicates with the host system through a host interface, and the host interface supports an out-of-order execution (OOE) feature.

4. The command processing method according to claim 1, wherein the threshold is 1.

5. The command processing method according to claim 1, wherein the processor I/O command execution time is an execution time of the processor for a plurality of functions corresponding to one of the I/O commands, and the functions are directly correlated to a data transmission of said one of the I/O commands.

6. The command processing method according to claim 1, wherein the data transmission time is an estimated data transmission time of one of the I/O commands.

7. The command processing method according to claim 1, wherein the storage controller maps a transmission direction and a size of the I/O commands to a group index of the groups through a look-up table, and searches the look-up table through a command sorter, wherein the command sorter categorizes the I/O commands into the groups.

8. The command processing method according to claim 1, wherein the storage controller maps a transmission direction and a size of the I/O commands to the data transmission time through a look-up table, and searches the look-up table through a command queue manager corresponding to each of the group.

9. The command processing method according to claim 8, wherein the expiration time is a total of the data transmission time of the I/O commands of the first group, wherein the data transmission time is obtained from the look-up table.

10. A storage controller, configured to access a rewritable non-volatile memory module and coupled to a host system, the storage controller comprising:
a command sorter;
a plurality of command queue managers, coupled to the command sorter;
an arbitrator, coupled to the command queue managers;
a timer, coupled to the arbitrator; and
a processor, coupled to at least one of the command sorter, the command queue managers and the arbitrator, wherein
the command sorter receives a plurality of I/O commands from the host system,
the command sorter categorizes the I/O commands into a plurality of groups according to a processor effort index of the I/O commands,
the arbitrator selects a first group from the groups, resets a tuner and obtains an expiration time corresponding to the first group according to the I/O commands of the first group, and the processor executes the I/O commands of the first group,
the arbitrator selects a second group from the groups and resets the timer when the expiration time of the first group expires,
wherein when the processor effort index of the first group is less than a threshold, a clock frequency of the processor is lowered before the expiration time expires, wherein the processor effort index is a processor I/O command execution time divided by a data transmission time corresponding thereto.

11. The storage controller according to claim 10, wherein the groups comprise a third group, and when the processor effort index of the I/O commands of the third group is less than a first value and the first value is less than the threshold, the processor lowers an original clock frequency of the processor to the original clock frequency multiplied by the first value before the expiration time of the third group expires.

12. The storage controller according to claim 10, wherein the storage controller communicates with the host system through a host interface, and the host interface supports an out-of-order execution feature.

13. The storage controller according to claim 10, wherein the threshold is 1.

14. The storage controller according to claim 10, wherein the processor I/O command execution time is an execution time of the processor for a plurality of functions corresponding to one of the I/O commands, and the functions are directly correlated to a data transmission of said one of the I/O commands.

15. The storage controller according to claim 13, wherein the data transmission time is an estimated data transmission time of one of the I/O commands.

16. The storage controller according to claim 10, wherein the storage controller maps a transmission direction and a size of the I/O commands to a group index of the groups through a look-up table, and searches the look-up table through a command sorter, wherein the command sorter categorizes the I/O commands into the groups.

17. The storage controller according to claim 10, wherein the storage controller maps a transmission direction and a size of the I/O commands to the data transmission time through a look-up table, and searches the look-up table through the command queue manager corresponding to each of the group.

18. The storage controller according to claim 17, wherein the expiration time is a total of the data transmission time of the I/O commands of the first group, wherein the data transmission time is obtained from the look-up table.

* * * * *